United States Patent [19]
Bigo et al.

[11] Patent Number: 5,388,852
[45] Date of Patent: Feb. 14, 1995

[54] COMPACT FOLDING CHILD'S STROLLER

[75] Inventors: Jean Bigo, Cholet; Laurent Ageneau, Mortagne sur Sèvre, both of France

[73] Assignee: Ampafrance S.A., Boulogne Billancourt Cedex, France

[21] Appl. No.: 85,059

[22] Filed: Jul. 2, 1993

[30] Foreign Application Priority Data

Jul. 2, 1992 [FR] France ............... 92 08177

[51] Int. Cl.⁶ .................................... B62B 7/06
[52] U.S. Cl. ................... 280/642; 280/644; 280/42; 280/650; 297/42
[58] Field of Search ............ 280/638, 38, 42, 642, 280/644, 647, 474, 649, 650; 297/354, 355, 374, 375, 376, 377, 42, 45, DIG. 4

[56] References Cited

U.S. PATENT DOCUMENTS

| | | | |
|---|---|---|---|
| 4,986,564 | 1/1991 | Liu | 280/642 |
| 5,074,575 | 12/1991 | Bigo | 280/642 |
| 5,288,098 | 2/1994 | Shamie | 280/42 |

FOREIGN PATENT DOCUMENTS

| | | |
|---|---|---|
| 1507446 | 11/1967 | France . |
| 2385363 | 10/1978 | France . |
| 2510060 | 1/1983 | France . |
| 2556680 | 6/1985 | France . |
| 2607770 | 6/1988 | France . |
| 3024657 | 1/1982 | Germany . |
| 3407241 | 8/1985 | Germany . |
| 2060515 | 5/1981 | United Kingdom . |
| 2139161 | 11/1984 | United Kingdom . |

*Primary Examiner*—Richard M. Camby
*Attorney, Agent, or Firm*—Oblon, Spivak, McClelland, Maier & Neustadt

[57] ABSTRACT

In a compact folding child's stroller a front leg and a rear leg each carry at least one wheel. A push bar has a holding area at its upper end. An articulated X-shape rear chassis joins together the two rear legs. Each push bar can slide parallel to the respective front leg between a deployed position and a folded position. Each rear leg is articulated to the respective front leg. A connecting link connects the lower end of each push bar to the respective rear leg. An operating link is articulated to the connecting link and connected to a sliding piece which slides on each rear leg and to which is articulated the upper end of the X-shape rear chassis in order to cause folding of the X-shape chassis and movement towards each other of the two lateral chassis units when the stroller is folded up.

18 Claims, 8 Drawing Sheets

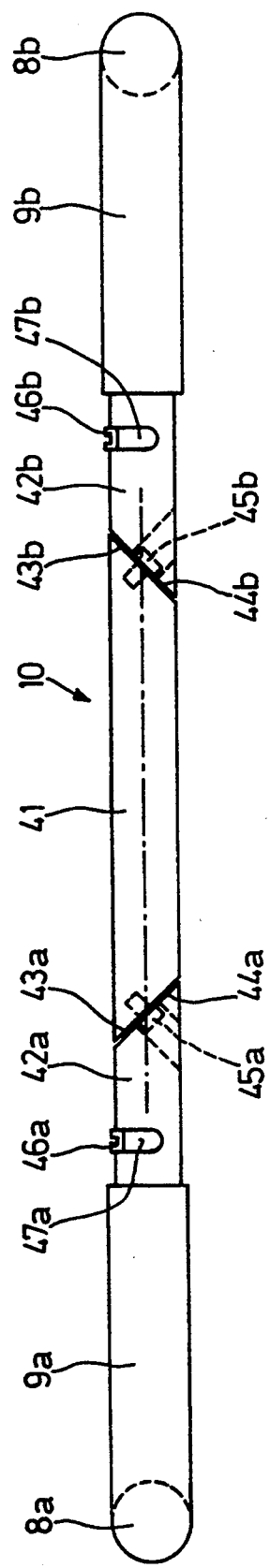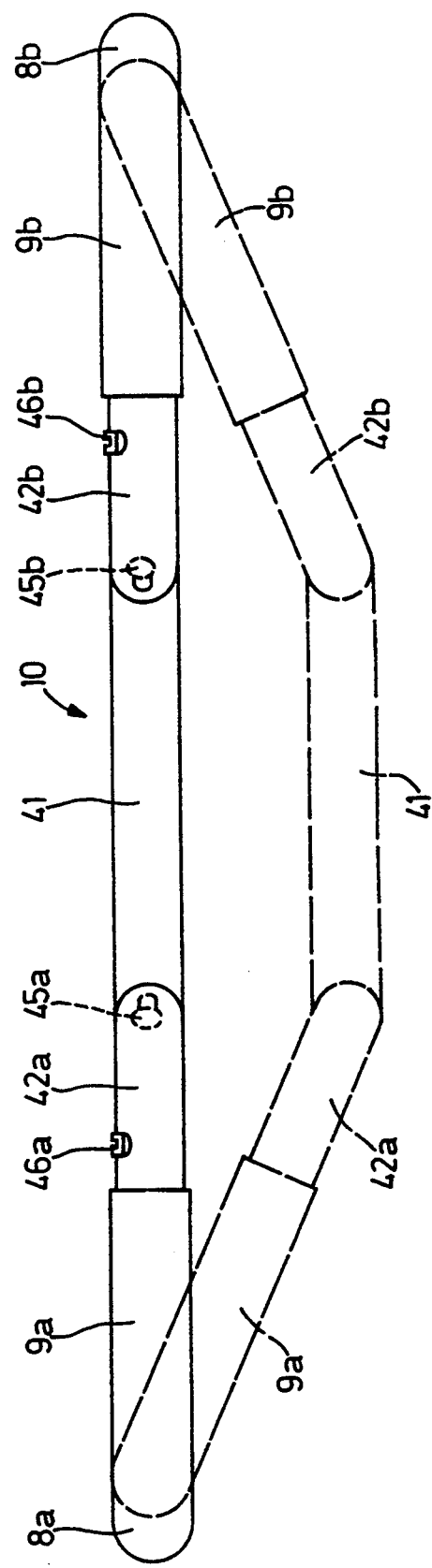

COMPACT FOLDING CHILD'S STROLLER

BACKGROUND OF THE INVENTION

1. Field of the Invention

The present invention concerns a child's stroller which is easily folded into a compact shape.

2. Description of the Prior Art

Various types of folding strollers for children are known. In a first type, as described in French patent 1 507 446 (MACLAREN), the frame of the stroller folds into a bundle which means that the folded stroller is bundled into a space whose overall transverse size is relatively small and which can thereafter be manipulated and transported like a cane. In the folded position the front wheels of the stroller are side by side, as are the rear wheels, and the set of front wheels and the set of rear wheels are as far apart as possible. Folding the stroller increases distance between the front and rear wheels, this increase in the lengthwise dimension being a consequence of the mode of folding and the relative reduction in the thickness of the folded bundle.

Folding in this manner has a number of advantages but increases the lengthwise overall dimension of the folded stroller. Also, the ends of the push bars, which usually have handles in place of a handlebar in the unfolded position of the stroller, are very near the rear wheels of the stroller when folded with the result that the person transporting the folded stroller may get dirty from contact with these wheels.

In another type of folding stroller shown in French patent 2 607 770 (AMPAFRANCE), for example, the chassis comprises two lateral chassis units which can be folded in respective substantially vertical planes and are linked transversely by rigid spacer members which may include a transverse handlebar which does not fold and the axles of the front and rear wheels. The stroller is folded flat by sliding push bars carrying the handlebar along a front underframe of the stroller. In one embodiment shown in this prior art document the front and rear wheels of the stroller when folded are close together although the wheels of each pair are still far apart because the transverse axle does not fold. Because the push bars carrying the handlebar slide in this way, the overall lengthwise dimension of the stroller is very small when folded flat. What is more, the wheels are all at substantially the same position at the opposite end from the handlebar in the folded position so that transporting the folded stroller does not involve any risk of getting dirty from contact with the wheels. However, this method of folding has the drawback that the folded stroller occupies a relatively large area, by the very fact of being folded flat, the width of the folded stroller being exactly the same as the width of the unfolded stroller.

An object of the present invention is to provide a folding child's stroller which folds more compactly than prior art strollers in a particularly simple way.

SUMMARY OF THE INVENTION

A folding child's stroller in accordance with the invention comprises two deformable lateral chassis units. Each lateral chassis unit comprises a front leg and a rear leg each having at least one wheel at its respective lower end. Each lateral chassis unit further comprises a push bar having a holding area at its upper end. This holding area may be shaped as an individual handle, for example, or form part of a folding handlebar.

This stroller in accordance with the invention further comprises an articulated X-shape rear chassis joining together the two rear legs of the lateral chassis units. Means are also provided for supporting a hammock or a body for receiving the child between the two lateral chassis units when the stroller is unfolded.

According to the invention each push bar is able to slide parallel to the respective front leg between a deployed position in which the push bar is substantially in alignment with the front leg and a folded position in which the push bar and the respective front leg are side by side. Each rear leg is preferably articulated to the respective front leg near its respective upper end.

A connecting link connects each push bar to the respective rear leg substantially in the vicinity of its lower end. An operating link is articulated to this connecting link and connected to a sliding piece which slides on each rear leg and to which the upper end of the X-shape rear chassis is also articulated. In this way when the stroller is folded the operating link causes the X-shape chassis to fold and the two lateral chassis units to move towards each other. By virtue of this structure, folding the stroller causes simultaneous deformation in two substantially vertical planes of the two lateral chassis units with relative movement towards each other of the front and rear wheels and simultaneous deformation of the rear X-shape chassis which causes the two lateral chassis units to move towards each other. The folded stroller is therefore particularly compact. Note in particular that the sliding of the push bars parallel to the front legs reduces the length of the folded stroller.

In the folded position the four wheels or sets of wheels are close together at the ends of the push bars opposite the holding area, so enabling the folded stroller to be transported with the utmost ease and convenience and without any risk of getting dirty from contact with the wheels. In the unfolded position the stiffness of the stroller chassis is due mainly to the X-shape chassis at the rear which joins together the two lateral chassis units. The stiffness can be increased, if required, by providing an articulated footrest at the front between the lower ends of the front legs and able to deform when the stroller is folded.

Note that the lowered position of the X-shape rear chassis in the unfolded stroller favors access from the rear of the stroller, for example to use a shopping basket which may advantageously be disposed in the lower part of the stroller.

In one advantageous embodiment of the invention the operating link is articulated to a part of the connecting link extending the latter beyond the point at which it is articulated to the rear leg.

The hammock support means preferably comprise two rods each pivoting on a sleeve sliding along the front leg and the push bar. These two sleeves may slide between a lower abutment position defined by the push bar and an upper abutment position defined by a sliding piece fastened to the upper end of the front leg, to which the rear leg may be articulated and through which the push bar can slide. Means such as a return spring, for example, may be provided to hold the sleeves in one or other of the abutment positions when the stroller is folded.

As already mentioned, the holding areas of the two push bars may be in the form of independent handles. In a preferred embodiment the two push bars are joined together by an assembly forming a transverse handlebar when the stroller is unfolded. This assembly may comprise two parts articulated together and to the push bars. In the preferred embodiment, however, the handlebar comprises a central handle which is rotated during folding of the stroller to rotate and move towards each other the respective push bars. The two ends of the central handle and the horizontal ends of the push bars constituting the transverse handlebar when the stroller is unfolded are at approximately 45° to the rotation axis of the central handle. The ends of the push bars are preferably provided with a rotary sleeve whose end at approximately 45° cooperates with the respective end of the central handle, an abutment being advantageously provided to restrict rotation of the sleeves. Means may also be provided on the central handle for locking it when the stroller is unfolded.

This arrangement has the advantage of increasing the stiffness of the unfolded stroller because of the presence of the transverse handlebar. Also, folding of the stroller is achieved in a particularly simple way by rotating the central handle of the transverse handlebar to initiate the movement of the lateral chassis units towards each other. Upon folding the stroller the ends at approximately 45° move the two push bars apart as soon as the central handle begins to rotate, which facilitates unfolding the stroller.

Note that this folding handlebar structure, which has considerable advantages in combination with the folding chassis structure as previously described, can also be adapted to other folding stroller designs without departing from the scope of the present invention. The invention therefore encompasses a folding child's stroller comprising two deformable lateral chassis units each of which Comprises a push bar the upper end of which is part of a folding handlebar member. The handlebar comprises a rotatable central handle which is rotated when folding the stroller to cause the respective push bars to move towards each other. The two ends of the central handle and the respective horizontal ends of the push bars which in the unfolded stroller form the transverse handlebar are at approximately 45° to the rotation axis of the central handle. The ends of the push bars can rotate and are also at approximately 45°, to cooperate with the ends of the central handle.

A locking device operative when the stroller is unfolded is preferably associated with at least one of the push bars, this device being unlocked automatically by rotation of said push bar caused as previously mentioned by rotation of the central handle of the transverse handlebar.

The locking device may advantageously comprise a simple spring-loaded pin disposed in an opening in the push bar and adapted to cooperate with a housing fixed relative to the front leg. This housing may be formed in the previously mentioned sliding piece, for example, and comprise a locking housing communicating with an unlocking groove. As an alternative, a rigid pin fastened to the push bar and cooperating with a spring-loaded ramp inside a locking housing may be used.

By virtue of this kind of arrangement, the rotation of the central handle of the transverse handlebar unlocks the push bar when folding begins to enable the push bar to slide in response to a force parallel to the front leg.

In a preferred embodiment a footrest comprising two folded parts hinged together in a toggle joint is disposed between the respective bottom parts of the two front legs. With the stroller completely unfolded the toggle joint goes beyond its locking point so that the footrest increases the stiffness of the stroller by providing an additional transverse spacer member. Means may be provided linking the footrest to a chassis member to lock and unlock the footrest automatically when folding and unfolding the stroller.

In a preferred embodiment the two parts of the folding footrest are mounted to the lower part of the front legs by means of a two-axis articulation which enables the footrest to fold and simultaneously change its orientation, the footrest being horizontal with the stroller unfolded and in the plane of the two front legs with the stroller folded.

At the end of the unfolding movement two operating rods fixed to the sliding pieces of the X-shape rear chassis interact with the parts of the footrest to lock the toggle joint automatically with the stroller completely unfolded. These rods also rotate the footrest in its plane.

The presence of the two operating rods provides the facility to install a shopping bag in the lower part of the stroller.

An automatic folding footrest of this kind is of great advantage in combination with the folding chassis structure previously described. Note, however, that it may equally well be adapted to other folding stroller structures without departing from the scope of the present invention.

The invention therefore encompasses a folding child's stroller comprising two deformable lateral chassis units each comprising a front leg and a rear leg, a folding footrest in two parts hinged together in a toggle joint and mounted between the respective lower parts of the two front legs by means of two-axis articulations enabling folding of the footrest and a change in its orientation brought about by operating members fixed in the vicinity of the rear legs.

To enable easy transport of the stroller in the completely folded position a strap may advantageously be fixed to the two sliding pieces of the X-shape rear chassis, for example. Pulling the strap completes the folding of the stroller and enables it to be transported in this position.

Safety interlock means operating with the stroller completely unfolded may of course be provided. A safety interlock hinged stay may be provided between the respective lower parts of the rear legs, for example.

The invention will be better understood from the following detailed description of one embodiment given by way of non-limiting example with reference to the appended drawings.

BRIEF DESCRIPTION OF THE DRAWINGS

FIG. 5 is a view to a larger scale of one embodiment of a folding stroller handlebar in the position it assumes when the stroller is fully unfolded.

FIG. 6 is a view analogous to FIG. 5 showing the first stage of folding of the handlebar.

DETAILED DESCRIPTION OF THE INVENTION

Figure 1:
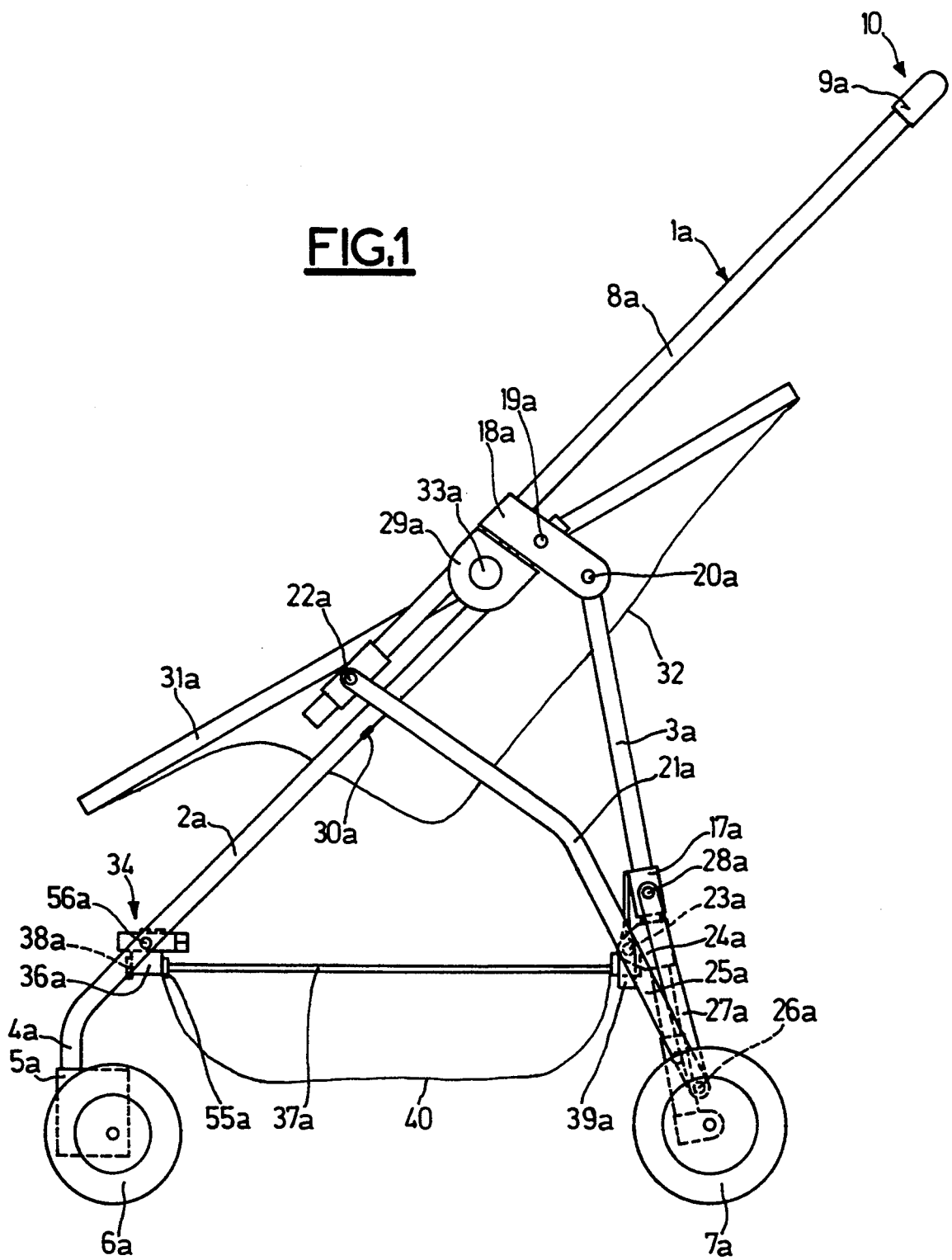
FIG. 1 is a side view of a stroller in accordance with the invention completely unfolded.
Figure 2:
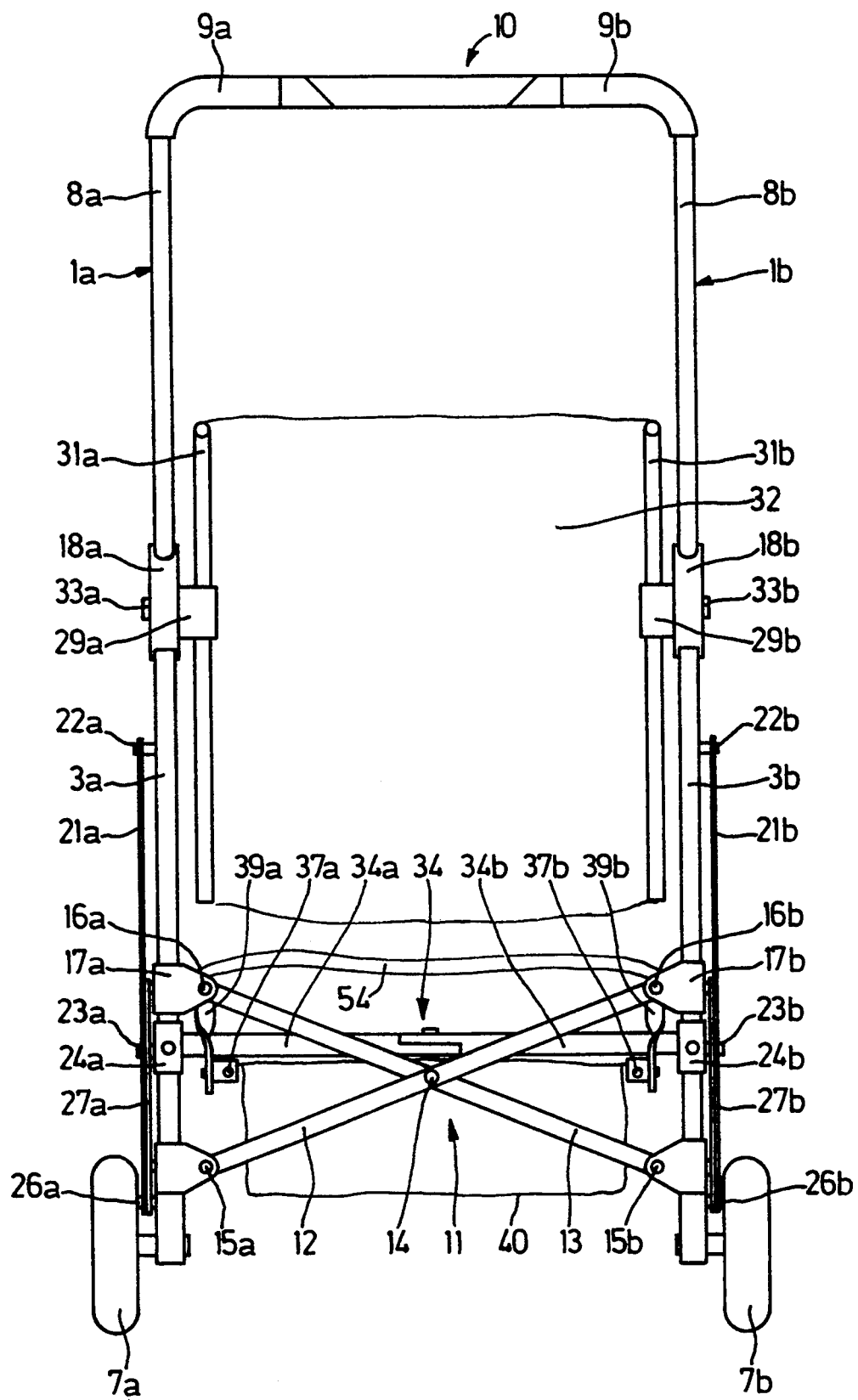
FIG. 2 is a rear view of the same stroller completely unfolded.
Figure 3:
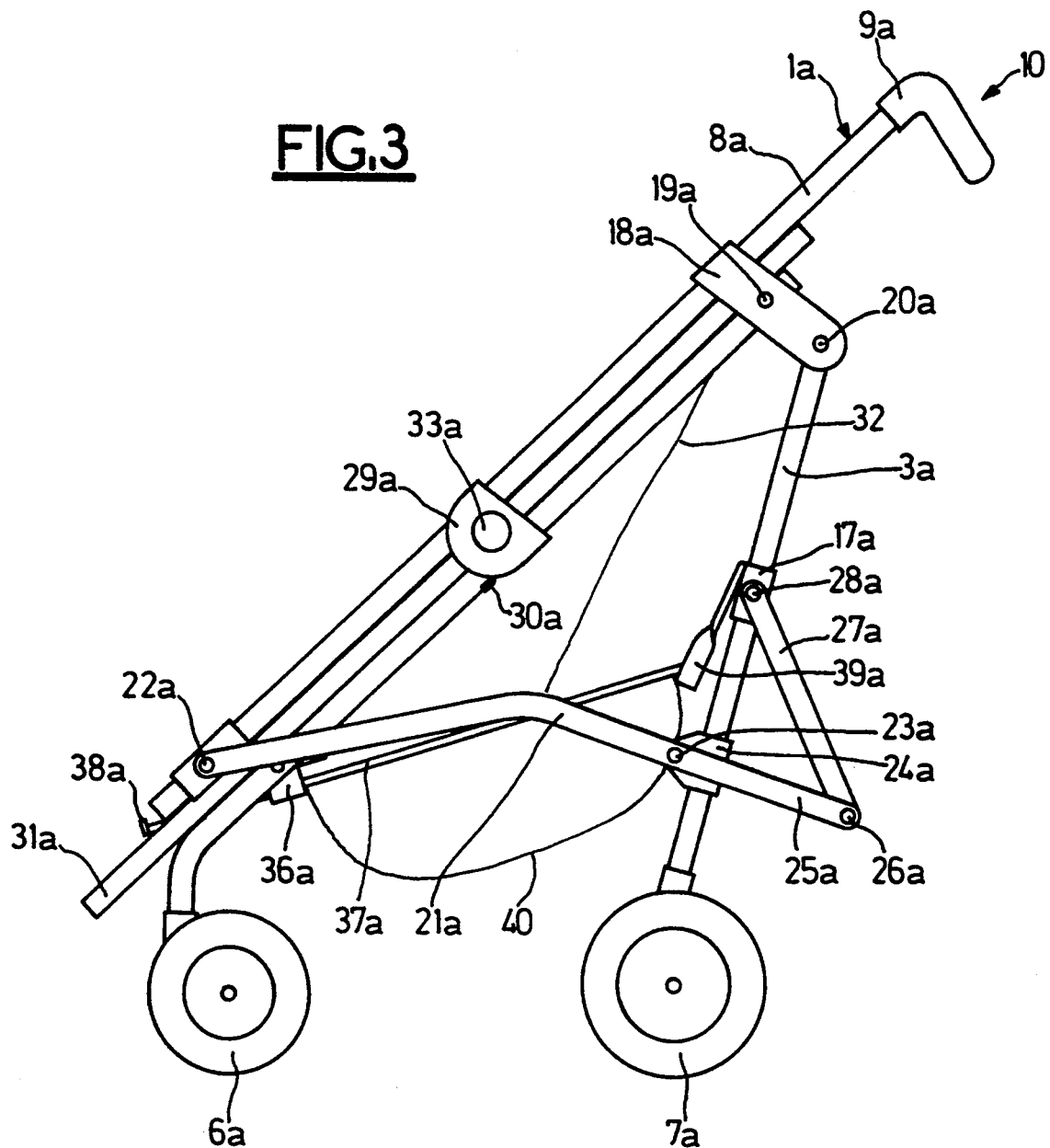
FIG. 3 is a side view analogous to FIG. 1 showing the stroller being folded.

As shown in FIGS. 1 through 3, this stroller in accordance with the invention comprises two lateral chassis units 1a and 1b seen in FIG. 2. The two lateral chassis units are identical and the component parts of the lateral unit 1a shown in FIG. 1 will now be described using the suffix a, it being understood that the lateral chassis unit 1b has the same components for which the suffix b is used.

Referring to FIG. 1, the lateral chassis unit 1a comprises a front leg 2a and a rear leg 3a. The front leg 2a has a lower end 4a which is slightly curved in the downward direction and which carries a suspension device 5a receiving a front wheel 6a or, in an alternative embodiment, a wheel unit comprising two wheels. The rear leg 3a has at its lower end an axle for a rear wheel 7a or, in an alternative embodiment, a wheel unit comprising two wheels.

FIG. 1 shows a push bar 8a which is also part of the lateral chassis unit 1a and has at its upper end a horizontal holding area 9a. FIG. 2 shows that the respective holding areas 9a, 9b of the two push bars 8a, 8a are joined together to form a transverse handlebar 10.

Referring to FIG. 2, at the rear of the stroller is an articulated X-shape chassis 11 comprising branches 12 and 13 articulated together at the center by a pin 14 to form an X shape. The lower ends of the branches 12 and 13 pivot on pins 15a, 15b fixed to the rear legs 3a and 3b near their lower end. The upper ends of the branches 12 and 13 pivot on pins 16a, 16b fastened to sliding sleeves 17a, 17b through which the respective rear legs 3a, 3b slide.

All these components may advantageously be made from light alloy tube, for example.

Referring again to FIG. 1, the lateral chassis unit 1a has a sliding piece 18a fastened by a pin 19a to the upper end of the front leg 2a. The sliding piece 18a also incorporates a pivot pin 20a about which the rear leg 3a can pivot. The sliding piece 18a further includes a passage through which the push bar 8a can slide parallel to the front leg 2a. In the completely unfolded position of the stroller as shown in FIG. 1 the lower end of the push bar 8a projects downwards relative to the sliding piece 18a.

A connecting link 21a is articulated at its upper end to a pin 22a fastened to the lower end of the push bar 8a. Near its lower end the connecting link 21a pivots on a pin 23a fastened to the lower part of the rear leg 3a. Note that in this example the pin 23a is mounted on a sleeve 24a fixed relative to the rear leg 3a and placed between the pins 15a and 16a (FIG. 2) of the branches 12 and 13 of the X-shape rear chassis 11 when the stroller is completely unfolded.

Figure 4:
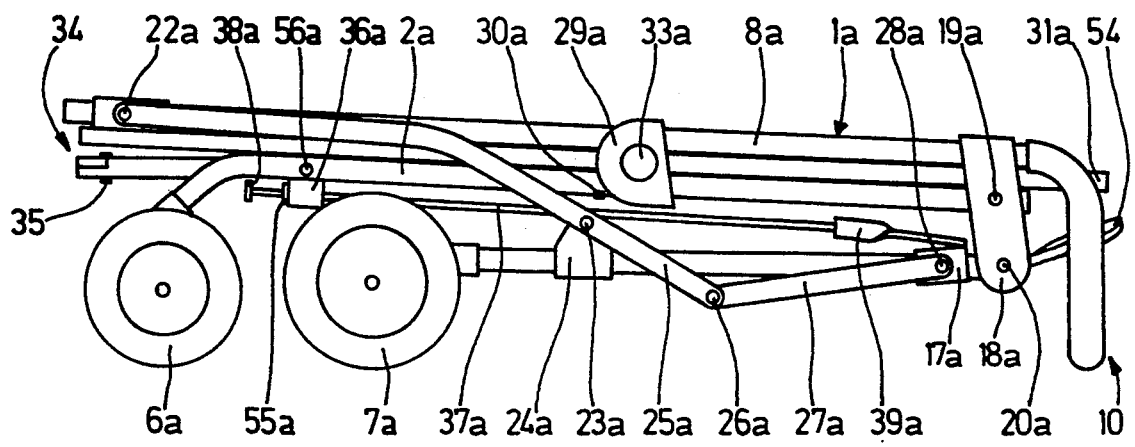
FIG. 4 is a diagrammatic side view of the stroller completely folded.

In the embodiment shown the connecting link 21a is bent slightly downwards, as can be seen in FIG. 1, to facilitate folding the stroller and to make the folded stroller more compact (see FIG. 4). The connecting link 21a extends beyond the pivot pin 23a in an extension 25a carrying at its lower end a pivot pin 26a about which pivots an operating link 27a the upper end of which is articulated by the pin 28a to the sliding sleeve 17a fastened to the upper end of the branch 13 of the X-shape rear chassis 11. The same arrangement is repeated on the lateral chassis unit 1b, the respective operating link 27b being articulated to the sliding sleeve 17b fastened to the upper end of the chassis 11. FIG. 2 shows that the connecting links 21a, 21b and the associated operating links 27a, 27b are preferably outside the lateral chassis units 1a and 1b, between the latter and the rear wheels 7a, 7b, and comprise flat metal strips to reduce the overall size of the assembly whilst making it very stiff.

The lateral chassis unit 1a also includes a sliding sleeve 29a through which the front leg 2a and the push bar 8a can slide freely. Like the similar sleeve 29b of the lateral chassis unit 1b the sleeve 29a can assume an upper abutment position defined by the sliding piece 18a in the completely unfolded position of the stroller as shown in FIGS. 1 and 2. It can also assume a lower abutment position defined by the abutment 30a on the front leg 2a in the completely folded position of the stroller shown in FIG. 4 and during folding as shown in FIG. 3. The sleeve 29a supports a rod 31a which can receive a woven fabric or like member forming a body 32 for receiving the child. Means (not shown in the figures) are conventionally provided on the sleeves 29a, 29b to enable pivoting of the rods 31a, 31b and therefore orientation of the body 32 from a seated position shown in FIG. 1 to a lying down position for younger children. Means 33a, 33b are also provided for locking the rods 31a, 31b in the required position relative to the sleeves 29a, 29b.

Figure 9:
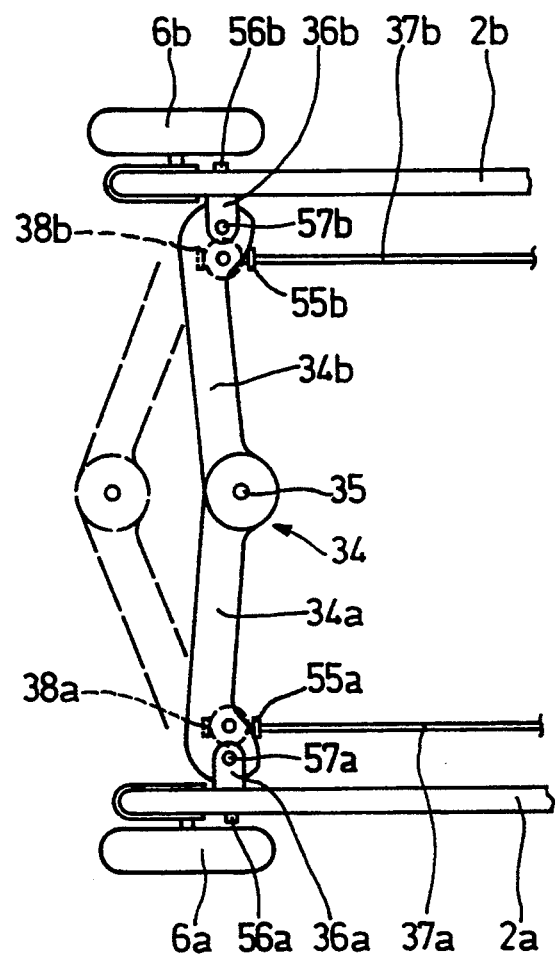
FIG. 9 is a plan view in cross-section of the lower part of the stroller showing the hinged footrest and its operating means.

A rigid footrest 34 has two folding branches 34a, 34b (FIGS. 2 and 9) hinged together in a toggle joint by a central pin 35. In the completely unfolded position of the stroller shown in full line in FIG. 9 the maximum distance apart position has been passed and the toggle joint is therefore locked. The ends of the branches 34a, 34b are respectively joined to the front legs 2a, 2b by yokes 36a, 36b which can rotate about pins 56a, 56b fastened to the lower part of the respective front legs 2a, 2b. The branches 34a, 34b can further pivot about pins 57a, 57b fastened to the yokes 36a, 36b. Two operating rods 37a, 37b having an abutment 38a, 38b at their end can pass through a passage in the folding branches 34a, 34b. Another abutment 55a, 55b is provided on each operating rod 37a, 37b so as to push back the folding branches 34a, 34b of the footrest 34 when the stroller is folded. At their opposite end the operating rods 37a, 37b are fixed to lugs 39a, 39b attached to sliding yokes 17a, 17b at the upper ends of the branches 12 and 13 of the X-shape chassis 11. Fabric 40 may be mounted on said rods 37a, 37b to form a shopping bag in the lower part of the stroller.

Figure 7:
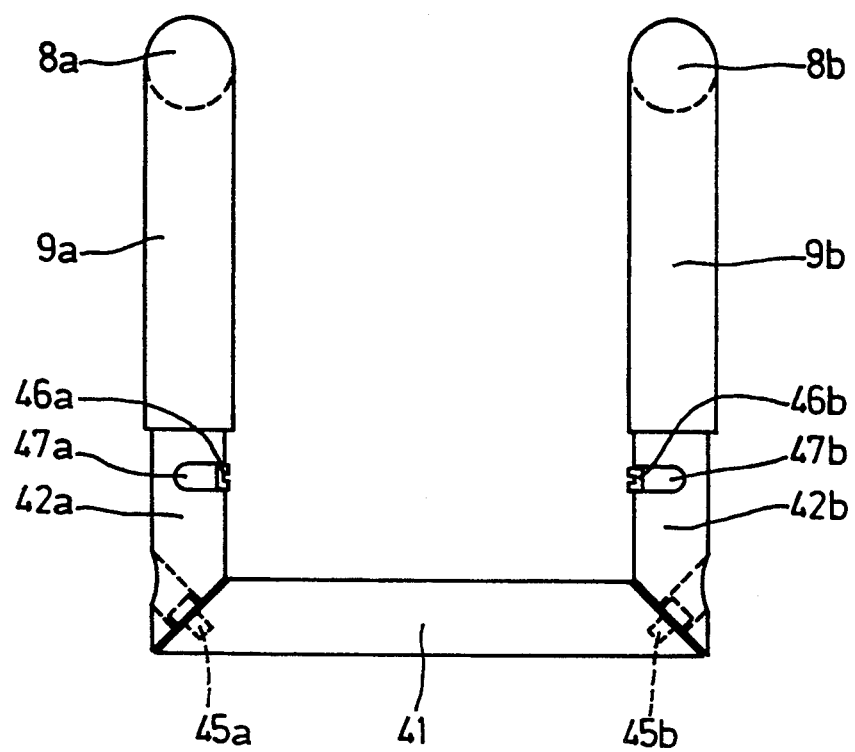
FIG. 7 is a view analogous to FIG. 5 showing the shape assumed by the handlebar when the stroller is completely folded.

Referring now to FIGS. 5 through 7 the structure and the operation of the specific embodiment shown in which the holding areas 9a, 9b form a transverse handlebar 10 with the stroller completely unfolded as shown in FIG. 2 will now be described. FIG. 5 shows the horizontal ends 9a and 9b of the push bars 8a, 8b. A central handle 41 links the ends 9a, 9b which each comprise a sleeve 42a, 42b which can rotate relative to the respective end 9a, 9b. The assembly is symmetrical and the lefthand part will be described here using the suffix a, it being understood that the righthand part is identical and is assigned the suffix b. The two ends 43a, 43b of the central handle 41 are in a plane inclined at approximately 45° to the rotation axis of the handle 41 shown in chain-dotted line in FIG. 5. This surface 43a at approximately 45° acts as a friction bearing against another surface 44a also at approximately 45° at the end of the sleeve 42a. The sleeve 42a is joined to the handle 41 by a hinge pin 45a perpendicular to the two bearing surfaces 43a and 44a which are also at an angle of approximately 45° to the rotation axis of the central handle 41. An abutment peg 46a attached to the end 9a may move between the respective ends of an oblong slot 47a in the sleeve 42a in order to restrict rotary movement of the latter. A locking device (not shown in the figures) may be provided to hold the central handle 41 in the position shown in FIG. 5.

In the position shown in FIG. 5 the hinge pins 45a, 45b are in the plane of the figure and the push bars 8a, 8b are perpendicular to the plane of the figure. The assembly comprising the central handle 41 and the ends 9a, 9b with their sleeves 42a, 42b immobilized by the abutments 46a, 46b forms a rigid unit equivalent to a transverse beam forming the handlebar 10 so that the child's stroller can be pushed without risk of any deformation. Note that the hinge pins 45a, 45b need not be exactly in the plane of FIG. 5.

If the central handle 41 is rotated approximately 90°, which rotates the two sleeves 42a, 42b by the same amount to their second abutment position in the slots 47a, 47b, as shown in FIG. 6, the two hinge pins 45a, 45b are still inclined at 45° and now define a plane coincident with the plane defined by the push bars 8a and 8b, in other words a plane perpendicular to the plane of the figure. In this position the handlebar 10 formed by the central part 41 and the ends 9a, 9b is no longer rigid and can easily be folded as shown in dashed outline in FIG. 6. This causes slight rotation of the two push bars 8a, 8b together with the onset of movement towards each other, given the flexibility of the tubes from which they are made. As rotation continues the ends 9a, 9b assume the position shown in FIG. 7, perpendicular to the central handle 41 which has rotated approximately 180° relative to the position shown in FIG. 6. During this movement the sleeves 42a and 42b again rotate 90° into abutment through cooperation of the pegs 46a, 46b with the oblong slots 47a, 47b. In the completely folded position shown in FIG. 7 the push bars 8a, 8b are as close as possible to the lateral chassis units 1a, 1b of which they form part. The transverse overall dimension of the stroller is equivalent in practise to the length of the central handle 41.

In the embodiment shown the locking of the stroller in the completely unfolded position as shown in FIGS. 1 and 2 is preferably achieved by rotation of the push bars 8a and 8b brought about by deformation of the handlebar 10.

Figure 8:
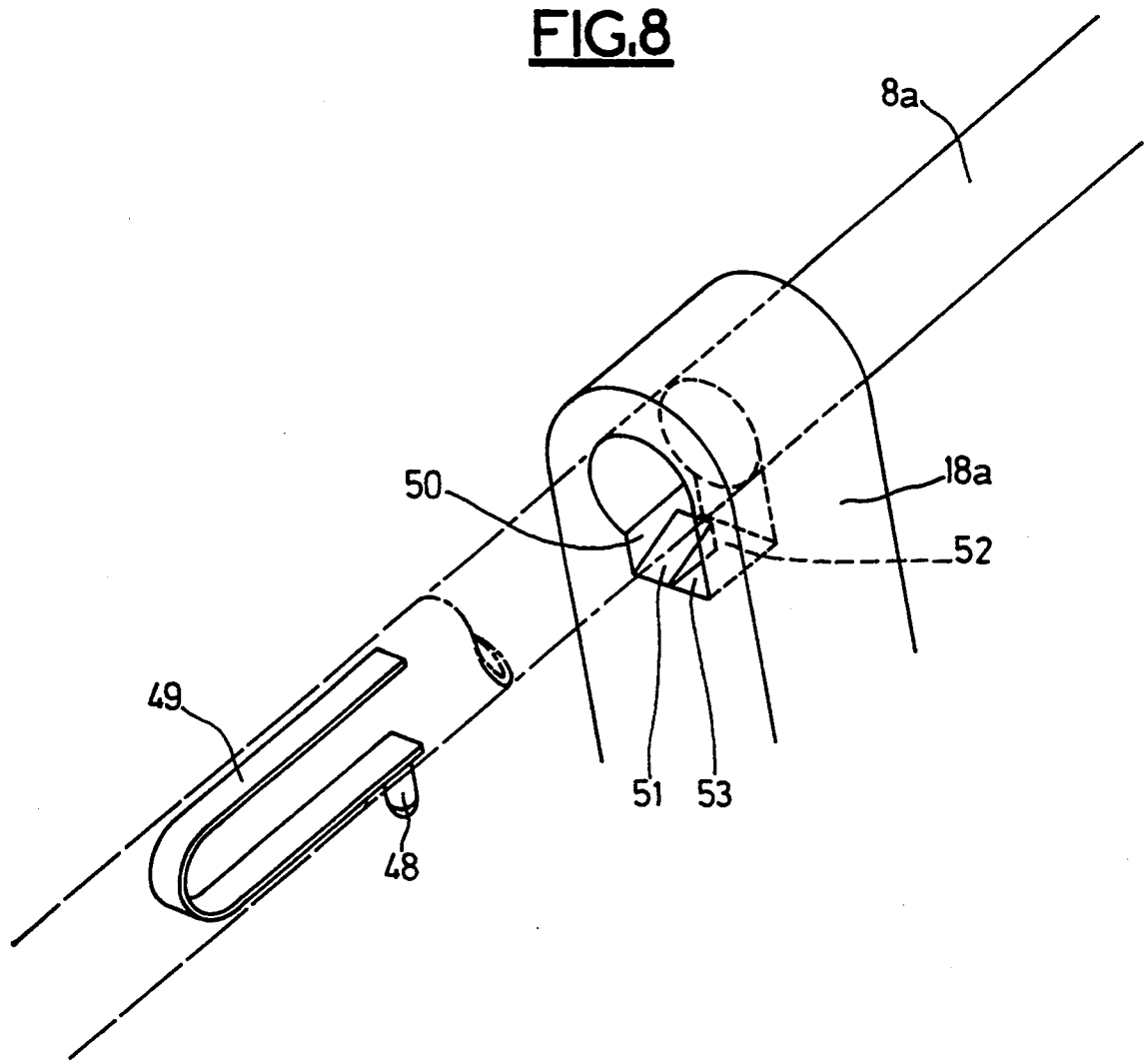
FIG. 8 is an enlarged partially cut away perspective view of an interlock device in the deployed position of one of the push bars of the stroller.

Reference should now be made to FIG. 8 which shows a locking device that may be provided on one or preferably both of the push bars. By way of example the locking device provided on the push bar 8a is described. This device comprises a spring-loaded pin 48 projecting from the tube constituting the push bar 8a through a hole in the latter. The pin 48 is spring-loaded by a curved leaf spring 49 inside the push bar 8a.

As previously explained, the push bar 8a can slide freely through the sliding piece 18a to which the front leg 2a is fixed and which incorporates the hinge pin 20a of the rear leg 3a. As shown in FIG. 8, the passage in the sliding piece 18a for the push bar 8a includes a housing 50 with an inclined ramp 51 beyond which is a locking housing 52 which communicates with a groove 53 parallel to and alongside the ramp 51.

As the push bar 8a slides upwards inside the sliding piece 18a in the passage 50 when the stroller is unfolded the peg 48 comes into contact with the inclined ramp 51 and is retracted by the latter until it is pushed into the housing 52 by the spring 49. The push bar 8a is then locked in position by the pin 48 which has entered the housing 52 and is abutted against the front of the ramp 51. Unlocking is effected simply by rotating the push bar 8a about its axis, which disengages the peg 48 from the housing 52, allowing it to escape from the passage 50 through the groove 53.

The push bar 8a is preferably rotated by turning the central handle 41 of the handlebar of the stroller, as previously mentioned.

To facilitate folding the stroller and transporting it in the completely folded position a carrying strap 54 may additionally be provided, as shown in FIG. 2 in particular, with its ends fixed to the two sleeves 17a, 17b at the upper ends of the X-shape chassis 11. Finally a safety interlock hinged stay (not shown in the figures) may advantageously be provided between the respective lower ends of the rear legs 3a, 3b.

A brief description of folding and unfolding the stroller in accordance with the invention will now be given with reference to the figures and in particular FIGS. 1 through 4.

Starting from the unfolded and locked position shown in FIGS. 1 and 2, the stroller in accordance with the invention is folded in the following manner:

One hand is placed on the central handle 41 of the handlebar 10 which is rotated approximately 90° to the position shown in FIG. 6. At the same time, and in the manner that is entirely natural once the handlebar 10 is unlocked, simply pressing on the central handle 41 starts folding of the handlebar 10 as shown in dashed outline in FIG. 6. The resulting automatic rotation of the two push bars 8a, 8b about their axes unlocks the respective locking pegs 48. Further downward pressure on the central handle 41 can therefore cause the push bars 8a and 8b to slide downwards. Because of the connecting links 21a, 21b and the operating links 27a, 27b this movement causes the sleeves 17a, 17b to slide upwards, in other words folding of the rear X-shape chassis in its own plane. The same downward pressure applied by one hand to the central handle 41 causes the two lateral chassis units 1a, 1b to fold in their vertical plane and at the same time to move towards each other by virtue of the folding of the X-shape chassis 11. As can be seen in FIG. 3, the rear wheels 7b move towards the front wheels 6a. At the same time the operating rods 37a, 37b are pushed forwards by the pivoting of the rear legs 3a, 3b and so unlock the toggle joint of the footrest 34 as shown in dashed outline in FIG. 9. During folding the operating rods 37a, 37b further cause rotation of the branches 34a, 34b around the two shafts 56a, 56b and 57a, 57b so that the footrest 34 moves from its locked horizontal position into a compact folded position in the same plane as the front legs 2a, 2b (see FIG. 4). To this end the operating rods 37a, 37b slide relative to the branches 34a, 34b through the passages therein.

In the completely folded position shown in FIG. 4 the stroller of the invention occupies a particularly small space. All the wheels 6a, 6b are close together in a single group at the opposite end from the handlebar 10 which is folded in three parts (see FIG. 7). The overall length is reduced to substantially that of the front legs 2a. Note that during folding the stroller body support rods 31a, 31b are also caused to slide downwards by the sleeves 29a, 29b which abut on the pegs 30a, 30b. The compact folded stroller is easily transported by holding the strap 54.

To unfold the stroller from the folded position shown in FIG. 4 it is grasped in one hand by the central handle 41 which is pulled upwards at the same as it is rotated in the opposite direction to the direction for folding the stroller. As soon as this rotation begins the push bars 8a, 8b and thus the two lateral chassis units start to move apart because of the surfaces 43 and 44 at 45°. The action of pulling on the central handle 41 causes the push bars 8a, 8b to slide upwards, in other words the unfolding of the two lateral chassis units 1a, 1b and simultaneously, because of the connecting links 21a, 21b and the operating links 27a, 27, the unfolding of the X-shape rear chassis which further moves apart the two lateral chassis unit 1a, 1b. At the same time the operating rods 37a, 37b interact with the branches 34a, 34b of the footrest 34 to unfold the latter and move it into the horizontal position. The rearward pivoting movement of the rear legs 3a, 3b applies traction to the operating rods 37a, 37b whose end abutments 38a, 38b cause the toggle joint to move beyond its locking point at the end of unfolding the stroller. Further rotation of the handle 41 is then all that is required to lock the handlebar 10 into its stiffening position as shown in FIG. 5. The push bars 8a, 8b are locked automatically when the locking pins 48 are pushed up into the respective locking holes 52 (FIG. 8). At the same time the sleeves 29a, 29b which support the rods 31a and 31b of the stroller body 32 can move upwards until they abut against the sliding pieces 18a, 18b. This movement can be assisted by spring means such as a spring (not shown in the figures).

The structure of the folding stroller in accordance with the invention thus not only provides an extremely compact folded configuration of short overall length with all wheels at the same place but also significantly simplifies folding and unfolding the stroller. Furthermore, in the folded configuration as shown in FIG. 4 it is possible for the stroller to stand up vertically resting on the front wheels 6a, 6b and the lower ends of the push bars 8a, 8b.

There is claimed:

1. Folding child's stroller comprising two deformable lateral chassis units each comprising: a front leg and a rear leg each having at least one wheel at its respective lower end; and a push bar having a holding area at its upper end; an articulated X-shape rear chassis joining together the two rear legs of said lateral chassis units; and means for supporting a hammock or a body for receiving the child between said two lateral chassis units when the stroller is deployed, in which stroller each push bar is adapted to slide parallel to the respective front leg between a deployed position in which said push bar is substantially aligned with said front leg and a folded position in which said push bar and the respective front leg are side by side; each rear leg is articulated to the respective front leg in the vicinity of their respective upper ends; a connecting link connects the lower end of each push bar to the respective rear leg; and an operating link is articulated to said connecting link and connected to a sliding piece sliding on each rear leg to which is also articulated an upper end of said X-shape rear chassis so that, when the stroller is folded up, it causes folding of said X-shape chassis and movement towards each other of said two lateral chassis units.

2. Stroller according to claim 1 wherein said X-shape rear chassis is in the lower part of said rear legs when said stroller is unfolded.

3. Stroller according to claim 1 wherein said operating link is articulated to a part of said connecting link extending the latter beyond its articulation to said rear leg.

4. Stroller according to claim 1 wherein said hammock support means comprise two rods each pivotally mounted on a sleeve sliding along said front leg and said push bar.

5. Stroller according to claim 4 wherein said two sleeves are adapted to slide between a lower abutment position defined on said push bar and an upper abutment position defined by a sliding piece attached to the upper end of said front leg, to which said rear leg is articulated and through which said push bar slides.

6. Stroller according to claim 1 wherein the ends of said two push bars are bent and joined together by a central handle which can be rotated to rotate and move towards each other or away from each other said two push bars respectively when folding or unfolding the stroller.

7. Stroller according to claim 6 wherein the ends of said central handle and the respective horizontal ends of said push bars have a bearing surface at 45° to the rotation axis of said central handle, the ends of said push bars being provided with a rotatable sleeve whose end has a bearing surface at 45° adapted to cooperate with the respective bearing surface of said central handle and hinge pins perpendicular to the respective two bearing surfaces.

8. Stroller according to claim 7 wherein an abutment is adapted to limit rotation of said sleeves and said central handle between a stiffening position in which the plane defined by said two hinge pins is substantially perpendicular to the plane defined by said two push bars and a folding position in which said plane defined by said two hinge pins is parallel to said plane defined by said two push bars.

9. Stroller according to claim 6 wherein a locking device operative in the unfolded position of the stroller is associated with at least one of said push bars, said device being unlocked by rotation of said push bar about its axis.

10. Stroller according to claim 9 wherein said locking device comprises a spring-loaded peg in an opening in said push bar adapted to cooperate with a housing fixed relative to said front leg.

11. Stroller according to claim 10 wherein said two sleeves are adapted to slide between a lower abutment position defined on said push bar and an upper abutment position defined by a sliding piece attached to the upper end of said front leg, to which said rear leg is articulated and through which said push bar slides, and said housing is in said sliding piece.

12. Stroller according to claim 10 wherein said housing incorporates a ramp delimiting a locking housing communicating with an unlocking groove.

13. Stroller according to claim 1 further comprising a folding footrest having two branches joined by a toggle joint disposed between the lower parts of said front legs.

14. Stroller according to claim 13 wherein said two branches of said folding footrest are mounted at the lower ends of said front legs by means of a respective two-axis articulation.

15. Stroller according to claim 13 wherein two operating rods are joined to said X-shape rear chassis and interact with said footrest during folding and unfolding of the stroller and at the end of unfolding lock said toggle joint of said footrest.

16. Stroller according to claim 14 wherein a flexible shopping bag is mounted on said two operating rods.

17. Stroller according to claim 1 wherein a strap for transporting the stroller when folded is fixed to said two sliding pieces of said X-shape rear chassis.

18. Stroller according to claim 1 characterized in that a safety locking hinged stay is disposed between the lower parts of said rear legs.

* * * * *